(12) United States Patent
Melough et al.

(10) Patent No.: US 12,021,285 B2
(45) Date of Patent: Jun. 25, 2024

(54) DUAL LEAF SPRING PRESSURE PLATE FOR A FLOW BATTERY STACK

(71) Applicant: Lockheed Martin Energy, LLC, Bethesda, MD (US)

(72) Inventors: Andrew Joseph Melough, Auburndale, MA (US); Jeremy S. Loretz, Palo Alto, CA (US)

(73) Assignee: Lockheed Martin Energy, LLC, Bethesda, MD (US)

( * ) Notice: Subject to any disclaimer, the term of this patent is extended or adjusted under 35 U.S.C. 154(b) by 0 days.

(21) Appl. No.: 18/353,960

(22) Filed: Jul. 18, 2023

(65) Prior Publication Data

US 2023/0361333 A1 Nov. 9, 2023

Related U.S. Application Data

(62) Division of application No. 17/580,933, filed on Jan. 21, 2022, now Pat. No. 11,764,388.

(51) Int. Cl.
| | |
|---|---|
| H01M 8/00 | (2016.01) |
| H01M 8/18 | (2006.01) |
| H01M 8/2404 | (2016.01) |
| H01M 8/248 | (2016.01) |

(52) U.S. Cl.
CPC ........... *H01M 8/248* (2013.01); *H01M 8/188* (2013.01); *H01M 8/2404* (2016.02)

(58) Field of Classification Search
CPC ........... H01M 10/0468; H01M 8/0258; H01M 8/188; H01M 8/248; H01M 8/2485; H01M 8/18; Y02E 60/10; Y02E 60/50
See application file for complete search history.

(56) References Cited

U.S. PATENT DOCUMENTS

| | | | |
|---|---|---|---|
| 10,777,913 B2 | 9/2020 | Evans et al. | |
| 2005/0186462 A1 | 8/2005 | Belanger et al. | |
| 2018/0233834 A1* | 8/2018 | Evans | H01M 8/188 |

FOREIGN PATENT DOCUMENTS

| | | |
|---|---|---|
| JP | 2005-149849 A | 6/2005 |
| JP | 2007-005169 A | 1/2007 |

OTHER PUBLICATIONS

International Patent Application No. PCT/US2023/061017; Int'l Search Report and the Written Opinion; dated Apr. 14, 2023; 12 pages.

* cited by examiner

Primary Examiner — Cynthia H Kelly
Assistant Examiner — Monique M Wills
(74) Attorney, Agent, or Firm — BakerHostetler

(57) ABSTRACT

Provided are assemblies, comprising: a first leaf spring; a second leaf spring; and at least one component; the first leaf spring and the second leaf spring being superposed over a first end of the at least one component so as to exert first and second forces, respectively, through first and second regions of the component. These assemblies are useful to apply different forces to a stacked assembly where a cross section of a component of the assembly comprises materials of different Young's moduli within that cross section, thereby compressing different regions of the component with different forces.

19 Claims, 6 Drawing Sheets

DUAL LEAF SPRING PRESSURE PLATE FOR A FLOW BATTERY STACK

CROSS REFERENCE TO RELATED APPLICATION

This application is a Divisional of U.S. application Ser. No. 17/580,933, "Dual Leaf Spring Pressure Plate For A Flow Battery Stack" (filed Jan. 21, 2022). The entireties of all forgoing application are incorporated herein by reference for any and all purposes.

TECHNICAL FIELD

The present disclosure relates to the field of flow batteries and energy storage systems.

BACKGROUND

Existing stacked assemblies, e.g., stacks of electrochemical cells in flow batteries, require the application of a compressive force to maintain the stacked components of the assembly in position. This compressive force can be significant in magnitude, especially in stacked assemblies where fluid is handled within the stack, as the level of compressive force must be sufficient to prevent fluid leakage from within the stacked components, but the force must also not be of a magnitude that damages any components of the assembly or that impairs the assembly's performance. Application of a suitable force is especially challenging when the components of the stack—or regions of those components—have different Young's moduli. In such a situation, a force high enough to properly compress and clamp together the more rigid regions of the components may be so high that the force damages the less rigid regions of the components or otherwise impairs the assembly's function. Accordingly, there is a long-felt need in the art for approaches of applying different forces to a stacked assembly where a cross section of a component of the assembly comprises materials of different Young's moduli within that cross section.

SUMMARY

In meeting the described long-felt need, the present disclosure provides, inter alia, an approach that includes multiple assemblies configured to apply different forces across the cross-section of a stacked component. This is especially useful for flow battery stack designs in which each cell structure is composed of an "active area" (e.g., electrode fabric) and a "non-active area" (e.g., frame) located co-centric with one other. The two areas are made of different materials, which materials have different Young's moduli and different long-term creep characteristics, and as a consequence, when under nominal compression the materials react differently.

The disclosed technology, however, decouples the compressive force to allow different loading vectors to be applied to the different regions in a cross-section of a stacked component. This can be achieved by nesting leaf springs and directing separate forces to the different regions in the cross-section of the stacked component. This can be done with both the force magnitude and the direction in which the force is applied.

The disclosed solution provides a number of advantages over existing approaches. First, the disclosed solution allows for simpler stack designs. Second, the disclosed technology allows for decoupled tuning over the lifetime of a flow battery stack as the materials creep at differing rates. Further, the disclosed design allows for a reduced part count from the current flow battery stack design because the disclosed approach removes the numerous repeat parts involved in a spring assembly. A further benefit of the disclosed technology is that the disclosed technology allows the stack to become a "touch-safe" device, as all of the high electrical potential parts become insulated from the exterior. Further, "touch-safe" connectors (such as boots, collars, or other elements) can be installed at electrical termination points so as to cover any parts having high electrical potential. This in turn reduces risks from service operations and allows for lower lifetime costs.

In meeting the described challenges, the present disclosure first provides an assembly, comprising: a first leaf spring; a second leaf spring; and at least one component; the first leaf spring and the second leaf spring being superposed over a first end of the at least one component, the first leaf spring being secured to a first spring retainer by one or more first leaf spring tie rods such that the first leaf spring exerts a first force in an axial direction through a first region of the at least one component, the first region extending in the axial direction, the first leaf spring being secured to a second spring retainer by one or more second leaf spring tie rods such that the second leaf spring exerts a second force in the axial direction through a second region of the at least one component, the second region extending in the axial direction, the first force differing from the second force in magnitude, and the first force and the second force acting to compress the at least one component.

Also provided are methods, comprising operating an assembly according to the present disclosure (e.g., according to any one of Aspects 1-17), so as to evolve an electrical current from one or more electrically active fluids introduced to the assembly or to store electrical energy in one or more electrically active fluids introduced to the assembly.

Further disclosed are methods, comprising: securing a first leaf spring and a second leaf spring superposed over one another such that (a) the first leaf spring exerts a first force in an axial direction into a first region of a cross-section of one or more components, the first region extending axially and defining a first Young's modulus, (b) the second leaf spring exerts a second force in an axial direction into a second region of the cross-section of the one or more components, the second region extending axially and defining a second Young's modulus, the first force differing from the second force in magnitude, and the first Young's modulus differing from the second Young's modulus.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings.

DETAILED DESCRIPTION OF ILLUSTRATIVE EMBODIMENTS

Figure 1:
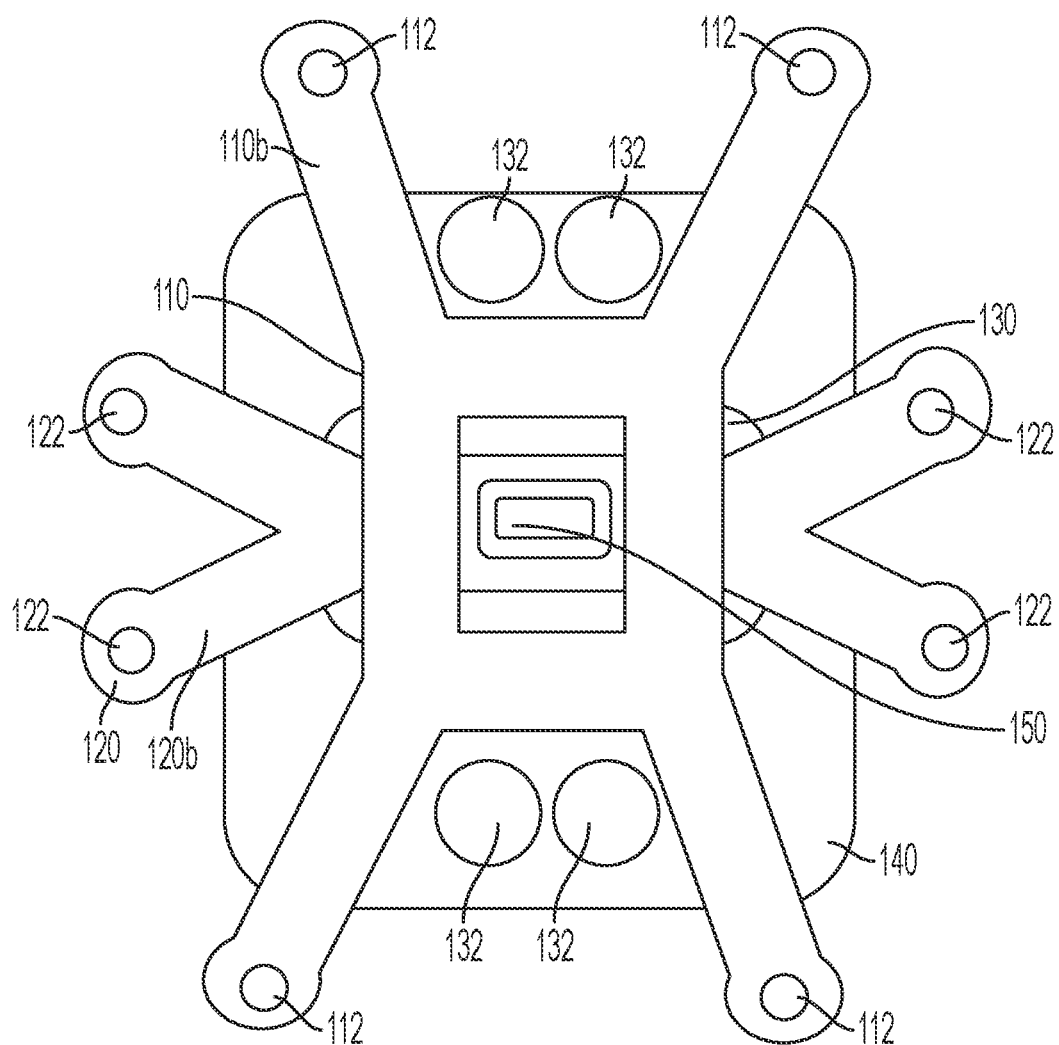
FIG. 1 provides an end view of an assembly according to the present disclosure.

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of" The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4. Further, the term "comprising" should be understood as having its open-ended meaning of "including," but the term also includes the closed meaning of the term "consisting." For example, a composition that comprises components A and B may be a composition that includes A, B, and other components, but may also be a composition made of A and B only. Any documents cited herein are incorporated by reference in their entireties for any and all purposes.

FIGURES

The appended figures illustrative only and do not limit the scope of the present disclosure or the appended claims.

FIG. 1 provides an end view of an assembly according to the present disclosure. As shown, first leaf spring 120 and second leaf spring 110 are superposed over one another. Second leaf spring 110 can include one or more arms 110*b*. Arm 110*b* can include an aperture or other engagement feature (e.g., a cutout, a slot, a tab, and the like) that engages with a second leaf spring tie rod 112. In the example shown in FIG. 1, second leaf spring 110 includes four arms and engages with four second leaf spring tie rods. This is exemplary only, and the number of arms of a leaf spring, the length of the arms, the angle of the arms relative to one another are not fixed and can vary depending on the needs of the user. As an example, a leaf spring can include 2, 3, 4, 5, 6, 7, 8, 9, 10, or more arms. A leaf spring can include arms arranged in a periodic fashion, but this is not a requirement. Arms can be arranged in a mirror-image fashion, e.g., such that each arm of a leaf spring is opposite another mirror-image arm, as shown by second leaf spring 110 in FIG. 1.

First leaf spring 120 can include one or more arms 120*b*. Arm 120*b* can include an aperture or other engagement feature (e.g., a cutout, a slot, a tab, and the like) that engages with a first leaf spring tie rod 122. In the example shown in FIG. 1, first leaf spring 120 includes four arms and engages with four second leaf spring tie rods. This is exemplary only, and the number of arms of a leaf spring, the length of the arms, the angle of the arms relative to one another are not fixed and can vary depending on the needs of the user.

As shown in FIG. 1, first isolator 130 can be engaged with first leaf spring 120, e.g., by direct contact between first isolator 130 and first leaf spring 120 or by way of a spacer or other element (not shown) positioned between first isolator 130 and first leaf spring 120. First isolator 130 can act to physically isolate first leaf spring 120 from components (not shown in FIG. 1) that are held in compression by first leaf spring 120 and second leaf spring 110. As described elsewhere herein, first isolator 130 can be an electrically insulating material.

Second isolator 140 can be engaged with second leaf spring 110, e.g., by direct contact between second isolator 140 and second leaf spring 110 or by way of a spacer or other element (not shown) positioned between second isolator 140 and second leaf spring 110. Second isolator 140 can act to physically isolate second leaf spring 110 from components (not shown in FIG. 1) that are held in compression by second leaf spring 110 and first leaf spring 120. As described elsewhere herein, first isolator 140 can be an electrically insulating material. One or more apertures 132 (e.g., channels, manifolds, and the like) can be formed in second isolator 140 (or in first isolator 130) so as to facilitate fluid delivery to any of the components held in compression by first leaf spring 120 and second leaf spring 110. As shown in FIG. 1, current collector 150 can extend through at least first isolator 130 and through first leaf spring 120 and second leaf spring 110.

Figure 2:
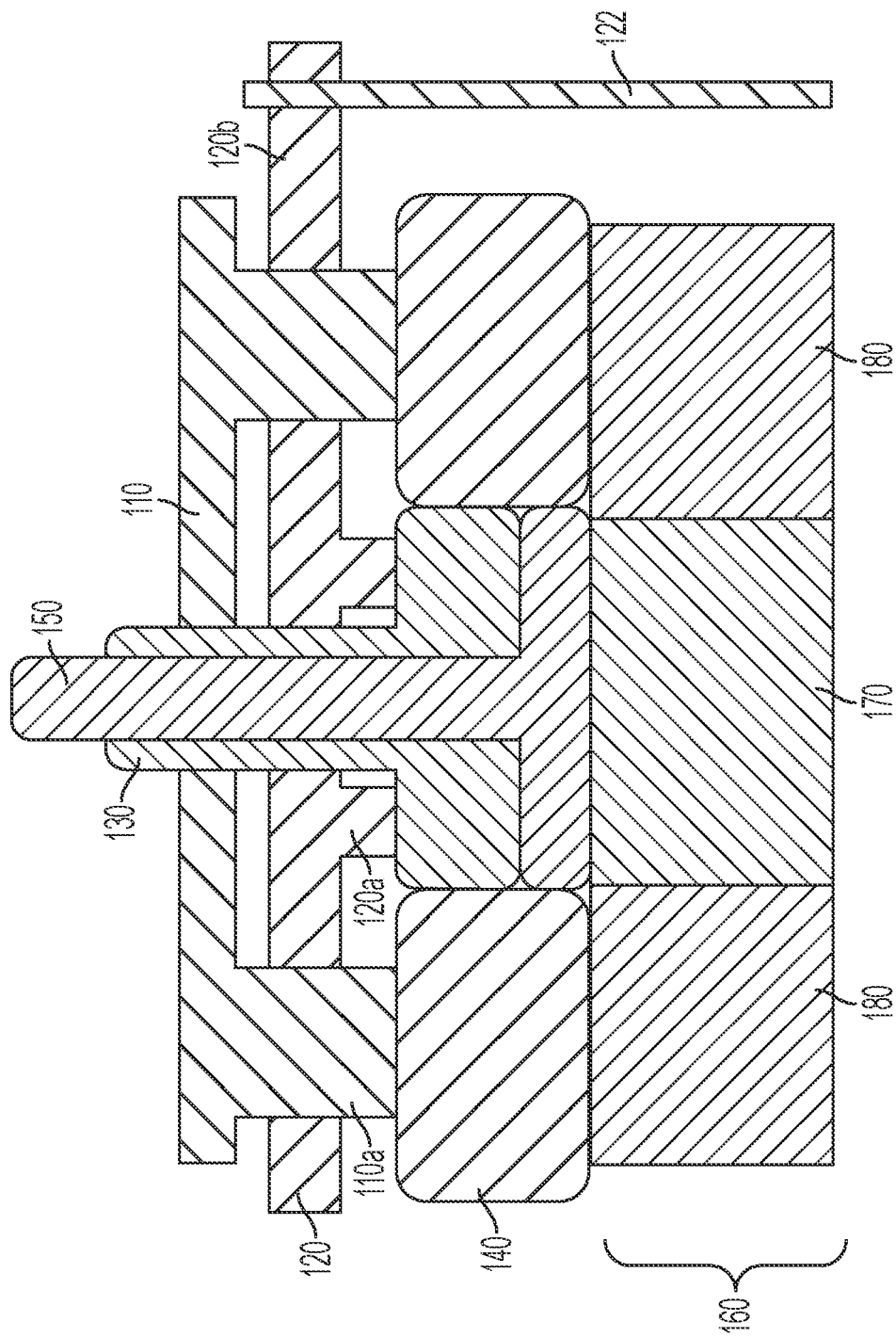
FIG. 2 provides a side view of an assembly according to the present disclosure.

FIG. 2 provides a side view of the assembly shown in FIG. 1. As shown, first leaf spring 120 can include one or more first leaf spring arms 120b, which arms can engage with one or more first leaf spring tie rods 122, which first leaf spring tie rods secure the first leaf spring to, e.g., another leaf spring or even a plate. First leaf spring 120 can include one or more feet 120a, which feet can contact directly to first isolator 130. This is not a requirement, however, as a further element (e.g., a pad or a further isolator) can be disposed between first leaf spring 120 and first isolator 130. As shown, force from first leaf spring 120 can be exerted through feet 120a into first isolator 130. Also as shown, current collector 150 can be disposed so as to extend through first isolator 130 and also through first leaf spring 120 and second leaf spring 110. Current collector 150 can be in electrical communication with first region 170 of component 160, e.g., by physical contact. Alternatively, a further conducting material can place current collector into electrical communication with first region 170 of component 160.

As shown in FIG. 2, second leaf spring 110 can include one or more feet 110a. These feet can engage with (e.g., via physical contact) second isolator 140 such that force from second leaf spring 110 is transmitted through second isolator 140 to second region 180 of component 160. As shown, this decouples the forces from first leaf spring 120 and second leaf spring 110, as the force from first leaf spring 120 is transmitted (by way of first isolator 130) into first region 170 of component 160. Similarly, the force from second leaf spring 110 is transmitted (by way of second isolator 140) into second region 180 of component 160. On account of this arrangement, one can effect different levels of force (e.g., compressive force) along different parallel axial lines in a stack of components. By reference to FIG. 2, the first regions 170 of a stack of components 160 will experience the force exerted by first leaf spring 120 through first isolator 130 (which can be shaped so as to exert force on first region 170 without exerting force against second region 180), while the second regions 180 of a stack of components 160 will experience the force exerted by the second leaf spring 110 through second isolator 140 (which can be shaped so as to exert force on second region 180 without exerting force against first region 170). In this way, the first regions 170 can experience a compressive force that is different than the compressive force experienced by the second regions 180. Such an arrangement is, as described elsewhere herein, advantageous when the stack of first regions may have a different Young's modulus than the Young's modulus of the stack of second regions.

For example, if the first regions are relatively soft (e.g., if they are formed of fabric) and the second regions are relatively rigid, the user may wish to apply a lesser force to the first regions than to the second regions so as to maintain the first regions compressed against one another and the second regions compressed against one another, but while accomplishing such compression without damaging the first regions. This arrangement is especially advantageous for electrochemical cell stacks comprising components formed of a relatively soft or compressible center portion (e.g., a portion of pervious fabric) that is framed by relatively rigid material, e.g., ABS polymer. By using the disclosed leaf spring arrangement to secure such a stack of components, one can exert a relatively high pressure against the relatively rigid stack of frames so as to ensure a leak-proof stack of components while also exerting a relatively lower pressure against the relatively less rigid stack of pervious fabric portions so as to ensure that the fabric portions are maintained sufficiently close to one another to allow for fluid flow within the fabric portions.

Component 160 is shown as having a first region 170 and a second region 180. First region 170 can be, e.g., an electrically active area, e.g., an electrode. Second region 180 can be a non-active area, e.g., a non-conductive frame that surrounds an (active) electrode. As shown, second region 180 can at least partially surround first region 170. Second region 180 can be in fluid communication with first region 170, e.g., via fluid channels or manifolds formed in second region 180 that communicate fluid to and/or from first region 170.

Figure 3:
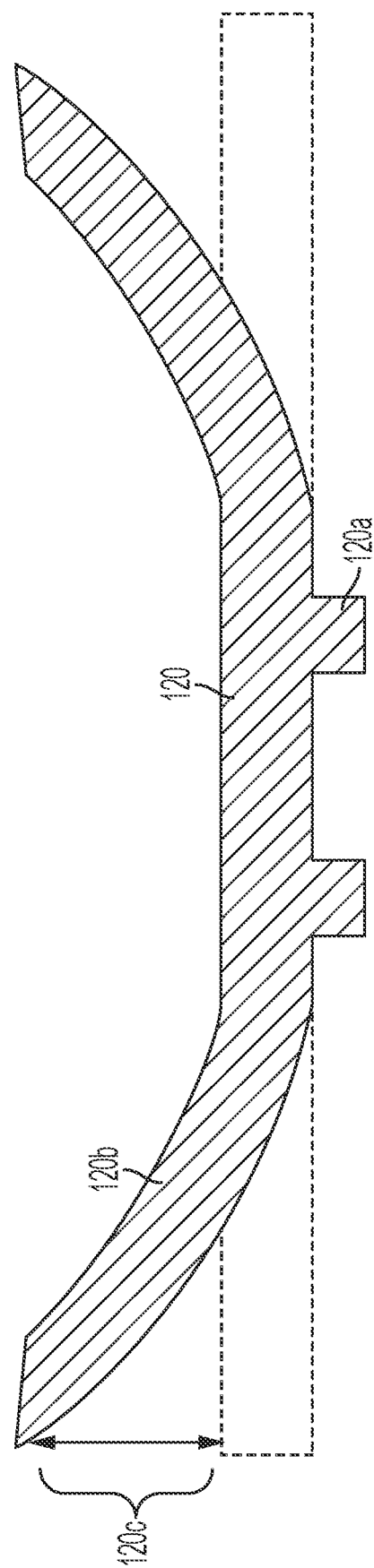
FIG. 3 provides a view of an exemplary leaf spring.

FIG. 3 provides a view of an exemplary first leaf spring 120. As shown, first leaf spring 120 can include one or more feet 120a and one or more arms 120b. An arm 120b can engage with one or more tie rods, not shown in FIG. 3. Travel 120c illustrates the distance traveled by arm 120b between the arm's natural (i.e., unstressed or unloaded) position and the arm's position (shown by dotted lines) when the arm is secured by a tie rod (not shown) to a retainer, e.g., a plate or another leaf spring.

Figure 4:
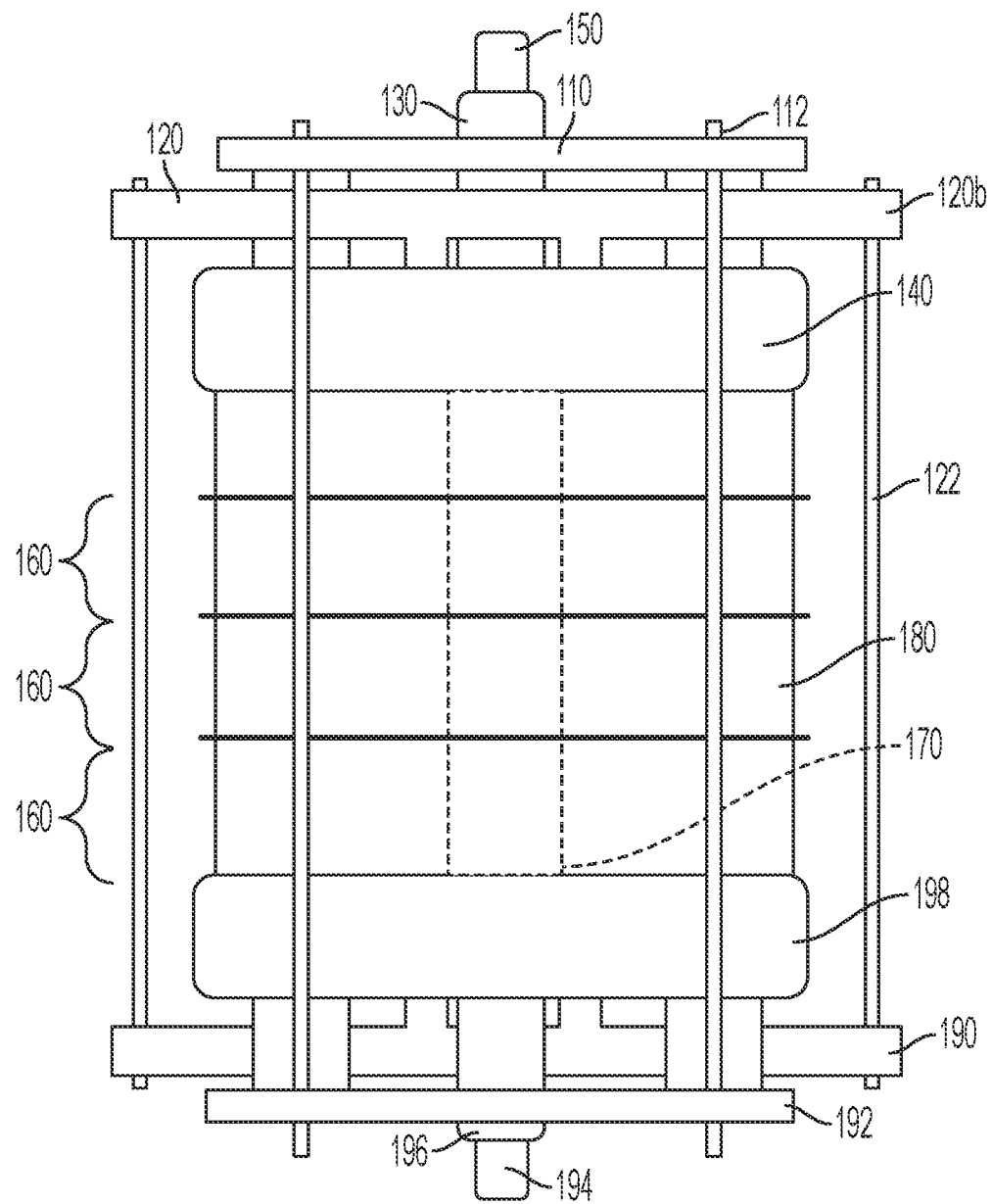
FIG. 4 provides a side view of an exemplary assembly according to the present disclosure.

FIG. 4 provides a side view of an exemplary assembly according to the present disclosure. As shown, second leaf spring 110 can engage with (e.g., via physical contact) second isolator 140 such that force from second leaf spring 110 is transmitted through second isolator 140 to second region 180 of component 160. Likewise, first leaf spring 120 can engage with (e.g., via physical contact) first isolator 130. As explained elsewhere herein, this decouples the forces from first leaf spring 120 and second leaf spring 110, as the force from first leaf spring 120 is transmitted (by way of first isolator 130) into first region 170 of component 160. Similarly, the force from second leaf spring 110 is transmitted (by way of second isolator 140) into second region 180 of component 160. On account of this arrangement, one can effect different levels of force (e.g., compressive force) along different parallel axial lines in a stack of components. By reference to FIG. 4, the first regions 170 of a stack of components 160 will experience the force exerted by first leaf spring 120, while the second regions 170 of a stack of components 160 will experience the force exerted by the second leaf spring 110. In this way, the first regions 170 can experience the compressive force exerted by first leaf spring 120, and the second regions 180 experience the force exerted by the second leaf spring 110.

As shown in FIG. 4, first leaf spring 120 can be secured by one or more first leaf spring tie rods 122 to a third leaf spring 190. Third leaf spring 190 can be engaged with third isolator 196, which isolator is configured to exert force against first regions 170. In this way, the compressive force experienced by the first regions 170 of the stack of components 160 is attributed to first leaf spring 120 and third leaf spring 190.

Second leaf spring 110 can be secured by one or more second leaf spring tie rods 112 to fourth leaf spring 192, as shown. Fourth leaf spring 192 can be engaged with fourth isolator 198, which isolator is configured to exert force against second regions 180. In this way, the compressive force experienced by the second regions 180 of the stack of components 160 is attributed to second leaf spring 110 and fourth leaf spring 198. It should be understood, however, that one or both of third leaf spring 190 and fourth leaf spring 198 can be a plate, e.g., a rigid member. As shown in FIG. 4, a further current collector 194 can be present; such a further current collector can be in electronic communication with first region 170 (or a plurality of such regions) of a component 160. Further current collector can, as shown, extend through one or more of third isolator 196, fourth isolator 198, third leaf spring 190, and fourth leaf spring 192.

Figure 5:
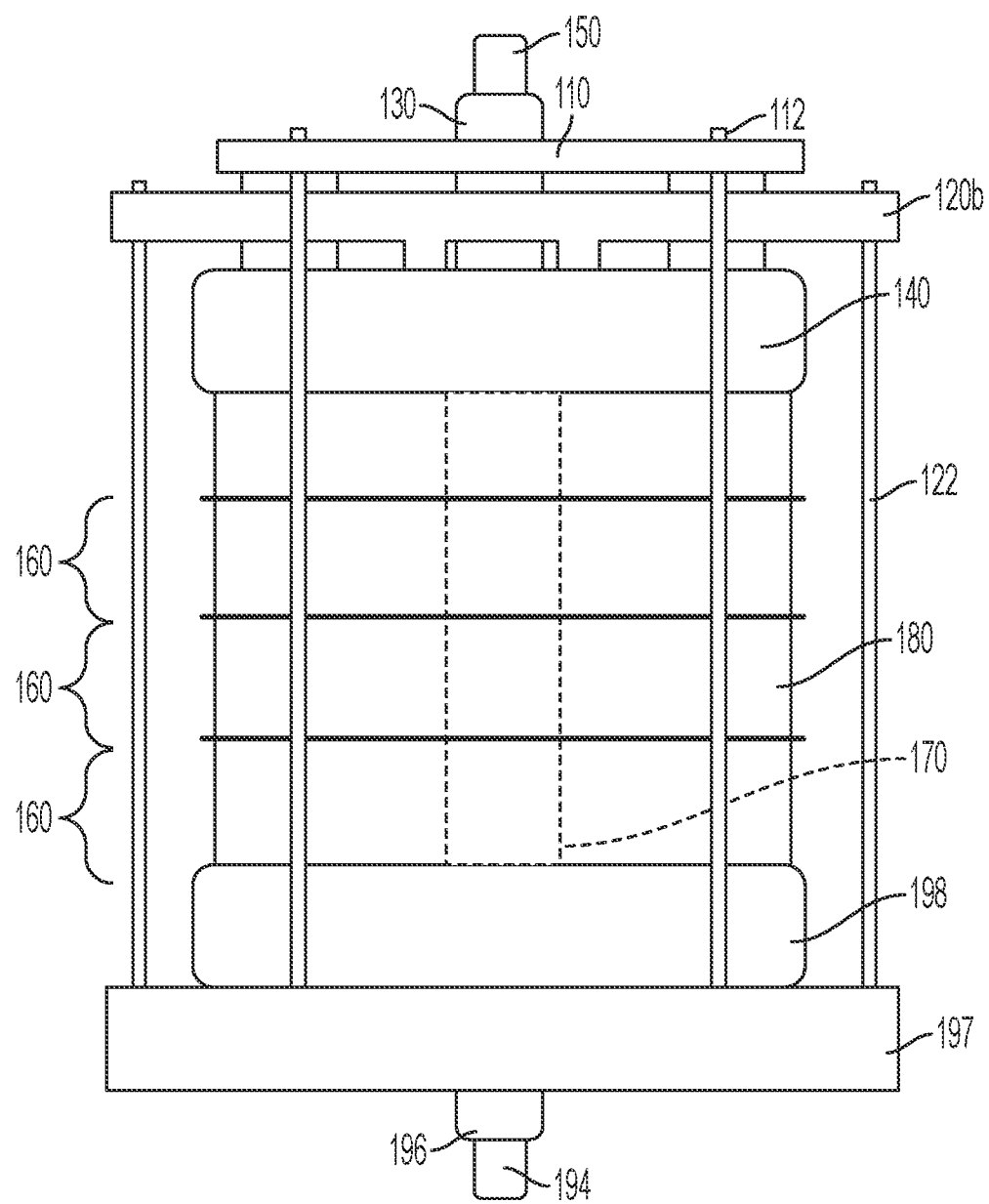
FIG. 5 provides a side view of another exemplary assembly according to the present disclosure.

FIG. 5 provides a side view of another exemplary assembly according to the present disclosure. As shown, second leaf spring 110 can engage with (e.g., via physical contact) second isolator 140 such that force from second leaf spring 110 is transmitted through second isolator 140 to second region 180 of component 160. Likewise, first leaf spring 120 can engage with (e.g., via physical contact) first isolator 130. As explained elsewhere herein, this decouples the forces from first leaf spring 120 and second leaf spring 110, as the force from first leaf spring 120 is transmitted (by way of first isolator 130) into first region 170 of component 160. Similarly, the force from second leaf spring 110 is transmitted (by way of second isolator 140) into second region 180 of component 160. On account of this arrangement, one can effect different levels of force (e.g., compressive force) along different parallel axial lines in a stack of components. By reference to FIG. 4, the first regions 170 of a stack of components 160 will experience the force exerted by first leaf spring 120, while the second regions 170 of a stack of components 160 will experience the force exerted by the second leaf spring 110. In this way, the first regions 170 can experience the compressive force exerted by first leaf spring 120, and the second regions 180 experience the force exerted by the second leaf spring 110.

As shown in FIG. 5, first leaf spring 120 can be secured by one or more first leaf spring tie rods 122 to plate 197. Third leaf spring 190 can be engaged with third isolator 196, which isolator is configured to exert force against first regions 170. In this way, the compressive force experienced by the first regions 170 of the stack of components 160 is attributed to first leaf spring 120.

Second leaf spring 110 can be secured by one or more second leaf spring tie rods 112 to plate 197, as shown. Fourth leaf spring 192 can be engaged with fourth isolator 198, which isolator is configured to exert force against second regions 180. In this way, the compressive force experienced by the second regions 180 of the stack of components 160 is attributed to second leaf spring 110. As shown in FIG. 5, a further current collector 194 can be present; such a further current collector can be in electronic communication with first region 170 (or a plurality of such regions) of a component 160. Further current collectors can, as shown, extend through one or more of third isolator 196, fourth isolator 198, third leaf spring 190, and fourth leaf spring 192.

Figure 6:
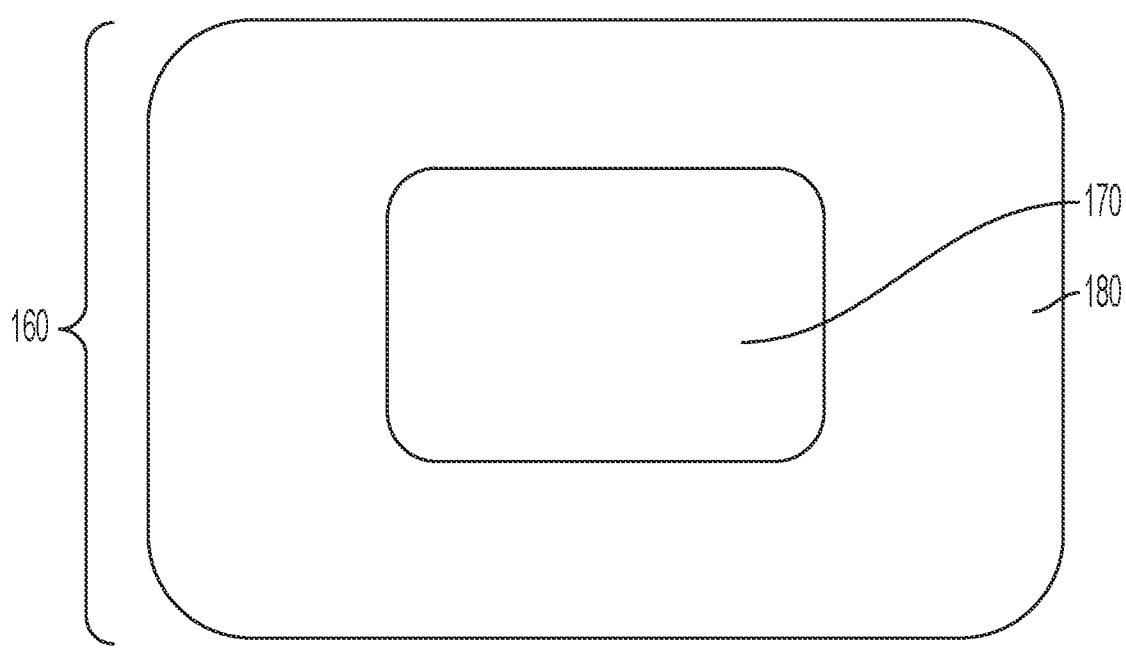
FIG. 6 provides a cross-sectional view of a component according to the present disclosures.

FIG. 6 provides a cross-sectional view of component 160. As shown, second region 180 can surround first region 170. As described elsewhere herein, second region 180 can be electrically non-active, e.g., second region 180 can be a non-conductive material such as ABS or another insulating material. First region 170 can be an electrically active region, e.g., a conductive fabric electrode. First region 170 and second region 180 can have different Young's moduli such that in a given cross-section of component 160, different parts of the cross-section exhibit (because of their material compositions) different Young's moduli.

ASPECTS

The following Aspects are illustrative only and do not limit the scope of the present disclosure or the appended claims.

Aspect 1. An assembly, comprising: a first leaf spring; a second leaf spring; and at least one component; the first leaf spring and the second leaf spring being superposed over a first end of the at least one component, the first leaf spring being secured to a first spring retainer by one or more first leaf spring tie rods such that the first leaf spring exerts a first force in an axial direction through a first region of the at least one component, the first region extending in the axial direction, the second leaf spring being secured to a second spring retainer by one or more second leaf spring tie rods such that the second leaf spring exerts a second force in the axial direction through a second region of the at least one component, the second region extending in the axial direction, the first force differing from the second force in magnitude, and the first force and the second force acting to compress the at least one component.

The disclosed assemblies can be used in a number of applications. As but one such application, a flow battery can comprise one or more assemblies according to the present disclosure.

A leaf spring can comprise metal, polymer, or combinations thereof. A leaf spring can comprise one or more arms, as shown in FIG. 1. A leaf spring can have a center portion from which the arms extend; the center portion can have an opening formed therein. As shown in FIG. 1, the opening can be square or rectangular in shape, although this is not a requirement. The arms of a leaf spring can be parallel to one another, but this also is not a requirement, as the arms can be arranged at non-right angles to one another. The first leaf spring and the second leaf spring can exert their respective forces in the same direction.

Aspect 2. The assembly of Aspect 1, further comprising one or more first isolators disposed between the first leaf spring and the at least one component such that the first force is directed into the one or more first isolators, and the one or more first isolators optionally being electrically nonconducting. An isolator can be a rigid material that does not compress when loaded, but this is a not a requirement, as an isolator can also be compressible.

Aspect 3. The assembly of any one of Aspects 1-2, further comprising one or more second isolators disposed between the second leaf spring and the at least one component such that the second force is directed into the one or more second isolators, and the one or more second isolators optionally being electrically nonconducting. An isolator can be formed of a nonconducting material, but can also be formed of a conducting material (e.g., a metal) that is then enrobed by a nonconducting material, e.g., a coating of polymer or rubber insulation.

Aspect 4. The assembly of any one of Aspects 1-3, wherein in a cross-section of the at least one component, the first region of the at least one component defines a first Young's modulus as measured in the axial direction and the second region of the at least one component defines a second Young's modulus as measured in the axial direction, and wherein the first Young's modulus differs from the second Young's modulus.

Aspect 5. The assembly of Aspect 4, wherein the second region at least partially surrounds the first region. Without being bound to any particular theory or embodiment, the second region can enclose the first region.

Aspect 6. The assembly of any one of Aspects 4-5, wherein the first region is electrically conductive and wherein the second region is electrically insulating.

Aspect 7. The assembly of any one of Aspects 1-6, wherein the at least one component comprises one or more electrodes, monopolar plates, bipolar plates, or any combination thereof.

Aspect 8. The assembly of any one of Aspects 1-7, wherein the at least one component comprises at least one fluid entrained therein.

Aspect 9. The assembly of Aspect 8, wherein the at least one fluid comprises an electrolyte. Suitable electrolytes include, without limitation, salt solutions, polymer electrolytes, and the like.

Aspect 10. The assembly of any one of Aspects 1-9, wherein the first force is in the range of from about 69 kPa to about 345 kPa as measured across the first region, e.g., from about 75 kPa to about 330 kPa, from about 90 kPa to about 300 kPa, from about 100 kPa to about 280 kPa, from about 120 kPa to about 250 kPa, from about 150 kPa to about 200 kPa, and all intermediate values and subranges.

Aspect 11. The assembly of any one of Aspects 1-10, wherein the second force is in the range of from about 550 to about 2425 kPa, as measured across the second region, e.g., from about 550 to about 2400 kPa, from about 600 to about 2200 kPa, from about 750 to about 2100 kPa, from about 900 to about 1900 kPa, from about 1000 to about 1800 kPa, from about 1200 to about 1500 kPa, and all intermediate values. The ratio of the first force to the second force can be, e.g., from about 10:1 to 1:10 and all intermediate values, e.g., from 10:1 to 1:10, from 9:1 to 1:9, from 8:1 to 1:8, from 7:1 to 1:7, from 6:1 to 1:6, from 5:1 to 1:5, from 4:1 to 1:4, from 3:1 to 1:3, from 2:1 to 1:2, and even about 1:1. In some embodiments, the first force and the second force differ from one another. The difference can be (relative to the first force) 5%, 10%, 25%, 50%, 75%, 100%, 150%, 200%, 250%, 300%, 350%, 400%, 450%, 500%, 550%, 600%, 650%, 700%, 750%, 800%, 850%, 900%, 950%, or even 1000%.

Aspect 12. The assembly of any one of Aspects 1-11, further comprising a current collector, the current collector being in electrical communication with the first region.

Aspect 13. The assembly of Aspect 12, wherein the current collector extends through a first isolator, the current collector optionally extending through the first leaf spring and the second leaf spring.

Aspect 14. The assembly of any one of Aspects 1-13, wherein one or both of the first spring retainer and the second spring retainer is a plate.

Aspect 15. The assembly of any one of Aspects 1-14, wherein one or both of the first spring retainer and the second spring retainer is a leaf spring.

Aspect 16. The assembly of any one of Aspects 1-15, further comprising one or more manifolds or channels configured to communicate a fluid from exterior to the assembly to the at least one component.

Aspect 17. The assembly of any one of Aspects 1-16, wherein the first leaf spring and the second leaf spring are free of or essentially free of mechanical engagement with one another. Thus, in some embodiments, the first leaf spring and the second leaf spring do not touch one another. In other embodiments, the first leaf spring and the second leaf spring contact one another.

Aspect 18. A method, comprising operating an assembly according to any one of Aspects 1-17, so as to evolve an electrical current from one or more electrically active fluids introduced to the assembly or to store electrical energy in one or more electrically active fluids introduced to the assembly. This can be accomplished by, e.g., connecting the assembly to a load and discharging electricity via the assembly to the load. This can also be accomplished by, e.g., placing the assembly into electronic communication with a current source so as to store electrical energy in an electrically active fluid introduced to the assembly.

Aspect 19. A method, comprising: securing a first leaf spring and a second leaf spring superposed over one another such that (a) the first leaf spring exerts a first force in an axial direction into a first region of a cross-section of one or more components, the first region extending axially and defining a first Young's modulus, (b) the second leaf spring exerts a second force in an axial direction into a second region of the cross-section of the one or more components, the second region extending axially and defining a second Young's modulus, the first force differing from the second force in magnitude, and the first Young's modulus differing from the second Young's modulus. The first leaf spring and the second leaf spring can exert their respective forces in the same direction.

Aspect 20. The method of Aspect 19, wherein the securing is effected with one or more tie rods.

Aspect 21. The method of any one of Aspects 19-20, wherein the first leaf spring is secured to a plate or a leaf spring and wherein the second leaf spring is secured to a plate or a leaf spring. The securing can be accomplished by, e.g., one or more tie rods.

Aspect 22. The method of any one of Aspects 19-21, wherein the one or more components comprises one or more electrodes, monopolar plates, bipolar plates, or any combination thereof.

Aspect 23. The method of any one of Aspects 19-22, wherein the first force is in the range of from about 69 kPa to about 345 kPa as measured across the first region, e.g., from about 75 kPa to about 330 kPa, from about 90 kPa to about 300 kPa, from about 100 kPa to about 280 kPa, from about 120 kPa to about 250 kPa, from about 150 kPa to about 200 kPa, and all intermediate values and subranges.

Aspect 24. The method of any one of Aspects 19-23, wherein the second force is in the range of from about 550 to about 2425 kPa, as measured across the second region, e.g., from about 550 to about 2400 kPa, from about 600 to about 2200 kPa, from about 750 to about 2100 kPa, from about 900 to about 1900 kPa, from about 1000 to about 1800 kPa, from about 1200 to about 1500 kPa, and all intermediate values. The ratio of the first force to the second force can be, e.g., from about 10:1 to 1:10 and all intermediate values, e.g., from 10:1 to 1:10, from 9:1 to 1:9, from 8:1 to 1:8, from 7:1 to 1:7, from 6:1 to 1:6, from 5:1 to 1:5, from 4:1 to 1:4, from 3:1 to 1:3, from 2:1 to 1:2, and even about 1:1. In some embodiments, the first force and the second force differ from one another. The difference can be (relative to the first force) 5%, 10%, 25%, 50%, 75%, 100%, 150%, 200%, 250%, 300%, 350%, 400%, 450%, 500%, 550%, 600%, 650%, 700%, 750%, 800%, 850%, 900%, 950%, or even 1000%.

Aspect 25. The method of any one of Aspects 19-24, wherein (a) one or more first isolators are disposed between the first leaf spring and the at least one component such that the first force is directed into the one or more first isolators, and the one or more first isolators are optionally electrically nonconducting, (b) wherein one or more second isolators are disposed between the second leaf spring and the at least one component such that the second force is directed into the one or more second isolators, and the one or more second isolators are optionally electrically nonconducting, or both (a) and (b).

What is claimed:

1. A method, comprising:
   securing a first leaf spring and a second leaf spring superposed over one another such that
   a. the first leaf spring exerts a first force in an axial direction into a first region of a cross-section of one or more components, the first region extending axially and defining a first Young's modulus,
   b. the second leaf spring exerts a second force in an axial direction into a second region of the cross-section of the one or more components, the second region extending axially and defining a second Young's modulus,
   wherein the securing is with one or more tie rods, the first force differing from the second force in magnitude, and the first Young's modulus differing from the second Young's modulus.

2. The method of claim 1, wherein the first leaf spring is secured to a plate or a leaf spring and wherein the second leaf spring is secured to a plate or a leaf spring.

3. The method of claim 1, wherein the one or more components comprises one or more electrodes, monopolar plates, bipolar plates, or any combination thereof.

4. The method of claim 1, wherein the first force is in the range of from about 69 to about 345 kPa, as measured across the first region.

5. The method of claim 1, wherein the second force is in the range of from about 550 to about 2425 kPa, as measured across the second region.

6. The method of claim 1, wherein (a) one or more first isolators are disposed between the first leaf spring and the one or more components such that the first force is directed into the one or more first isolators, and the one or more first isolators are optionally electrically nonconducting, (b) wherein one or more second isolators are disposed between the second leaf spring and the at least one component such that the second force is directed into the one or more second isolators, and the one or more second isolators are optionally electrically nonconducting, or both (a) and (b).

7. The method of claim 6, wherein one or more first isolators are disposed between the first leaf spring and the one or more components such that the first force is directed into the one or more first isolators, and the one or more first isolators are electrically nonconducting.

8. The method of claim 6, wherein one or more second isolators are disposed between the second leaf spring and the one or more components such that the second force is directed into the one or more second isolators, and the one or more second isolators are electrically nonconducting.

9. The method of claim 1, wherein the second region is essentially free of the first force.

10. The method of claim 1, wherein the first region is essentially free of the second force.

11. The method of claim 1, further comprising effecting fluid flow within the first region.

12. The method of claim 1, wherein the second force renders the second region leak-proof.

13. The method of claim 1, further comprising collecting a current from the first region.

14. The method of claim 1, wherein the first region is electrically active.

15. The method of claim 1, wherein the second region is electrically inactive.

16. The method of claim 1, further comprising effecting fluid delivery to the first region.

17. The method of claim 1, further comprising effecting fluid delivery to the second region.

18. The method of claim 1, wherein the first leaf spring defines a major axis and the second leaf spring defines a major axis perpendicular to the major axis of the first leaf spring.

19. The method of claim 1, wherein the first region is enclosed within the second region, and wherein the second force is greater in magnitude than the first force.

* * * * *